United States Patent
Zhang et al.

(10) Patent No.: US 11,025,147 B2
(45) Date of Patent: Jun. 1, 2021

(54) VIBRATION MOTOR

(71) Applicant: AAC Technologies Pte. Ltd., Singapore (SG)

(72) Inventors: Tao Zhang, Shenzhen (CN); Jinquan Huang, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 43 days.

(21) Appl. No.: 16/526,965

(22) Filed: Jul. 30, 2019

(65) Prior Publication Data

US 2020/0044530 A1 Feb. 6, 2020

(30) Foreign Application Priority Data

Aug. 3, 2018 (CN) .......................... 201821254811.4

(51) Int. Cl.
*H02K 33/10* (2006.01)
*H02K 33/16* (2006.01)

(52) U.S. Cl.
CPC ............. *H02K 33/10* (2013.01); *H02K 33/16* (2013.01)

(58) Field of Classification Search
CPC ........ H02K 33/18; H02K 33/14; H02K 33/02; H02K 35/00; H02K 33/00; H02K 33/10; B06B 1/045
USPC .......... 310/15, 17, 21, 23, 25, 26, 27, 28, 29
See application file for complete search history.

(56) References Cited

U.S. PATENT DOCUMENTS

| | | | | | |
|---|---|---|---|---|---|
| 1,495,827 | A | * | 5/1924 | Warren ................. | H02K 21/185 310/163 |
| 3,522,460 | A | * | 8/1970 | Spurlin .................. | H02K 33/02 310/29 |
| 2011/0198949 | A1 | * | 8/2011 | Furuich .................. | H02K 33/16 310/25 |
| 2012/0025742 | A1 | * | 2/2012 | Masahiko ............. | H02P 25/032 318/114 |
| 2013/0342035 | A1 | * | 12/2013 | Kim ....................... | H02K 33/00 310/25 |
| 2019/0006926 | A1 | * | 1/2019 | Zhu ........................ | H02K 33/02 |
| 2020/0044530 | A1 | * | 2/2020 | Zhang .................... | H02K 33/10 |
| 2020/0052565 | A1 | * | 2/2020 | Zhang .................... | H02K 11/33 |

* cited by examiner

*Primary Examiner* — Ahmed Elnakib
(74) *Attorney, Agent, or Firm* — W&G Law Group LLP

(57) ABSTRACT

A vibration motor includes a housing, and a stator, a vibrator, and an elastic support component elastically supporting the vibrator that are accommodated in the housing. The housing includes a top wall, a bottom wall disposed opposite the top wall and a side wall, the stator includes a first coil, a second coil and an iron core disposed corresponding to the coil, the first the coil and the second coil are sleeved over the iron core respectively from two ends of the iron core, the vibrator is sleeved around the stator and spaced from the stator, the elastic support component supports the vibrator to axially vibrate, the top wall is provided with a through hole running through the top wall, the first coil is provided with a coil lead wire, and the coil lead wire extends from the through hole to the exterior of the housing.

7 Claims, 2 Drawing Sheets

VIBRATION MOTOR

TECHNICAL FIELD

The present disclosure relates to the field of vibration motors, and in particular, to a micro vibration motor applied to a mobile communications device.

BACKGROUND

With the development of electronic technologies, portable consumer electronic products become more popular with people. The portable consumer electronic products, such as mobile phones, handheld game consoles, navigation apparatuses, and handheld multimedia entertainment devices generally use a vibration motor in system feedback, for example, in an incoming call prompt of a mobile phone, a message prompt, a navigation prompt, and vibration feedback of a game console. Such a wide range of application requires high performance of the vibration motor and a long service life.

A vibration motor generally includes a housing having an accommodation space, a vibrator accommodated in the accommodation space, a coil, and an elastic support component connecting the housing and the vibrator. The elastic support component supports the vibrator moving along a horizontal direction reciprocally in the housing to vibrate. In the vibration motor having an existing structure, lead wires are connected inside the housing, and when there is a plurality of coils, winding or breaking of the lead wires are extremely easily caused, which affects reliability performance of the product.

Therefore, a new vibration motor needs to be provided to resolve the foregoing problem.

DETAILED DESCRIPTION

The present disclosure is further described below with reference to the accompanying drawings.

Figure 1:
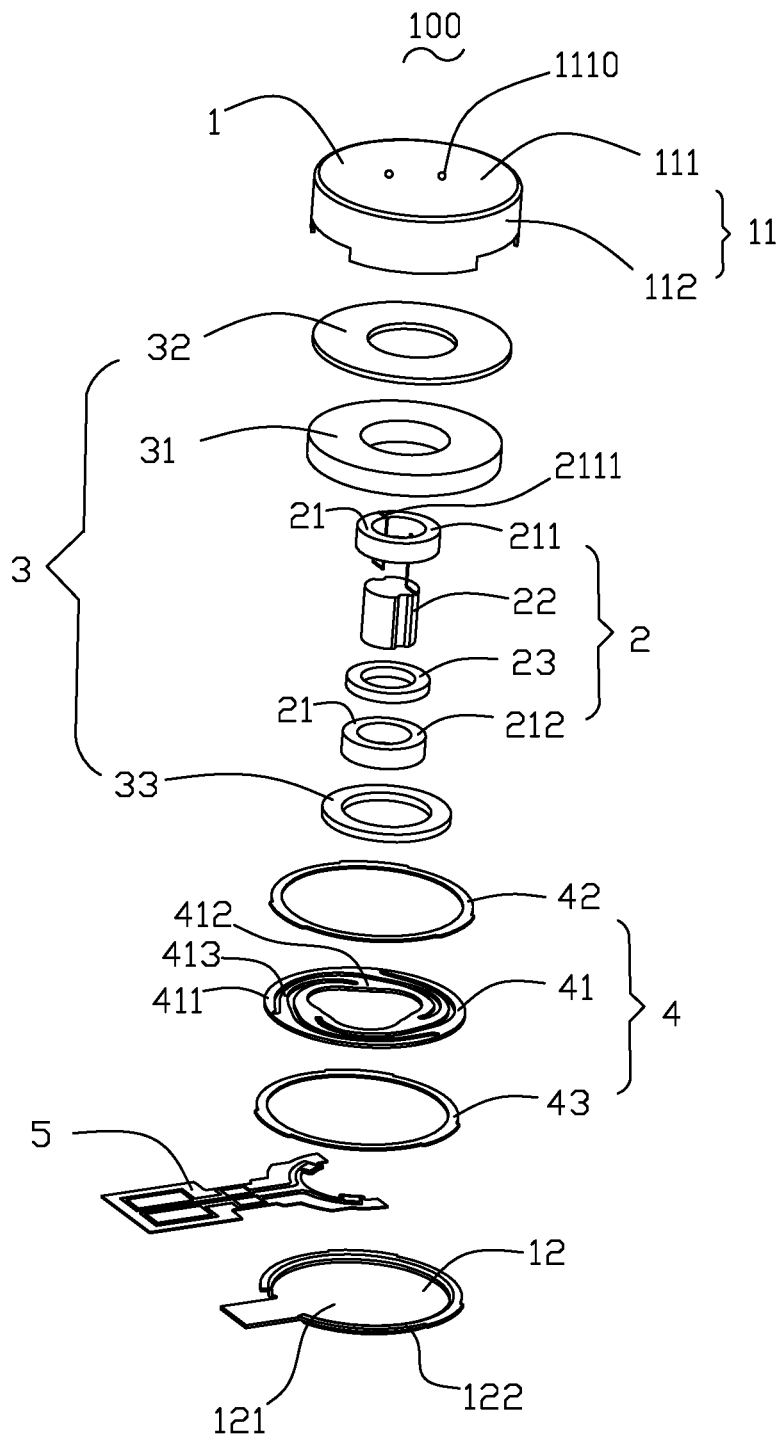
FIG. 1 is an exploded schematic structural diagram of a vibration motor according to the present disclosure.
Figure 2:
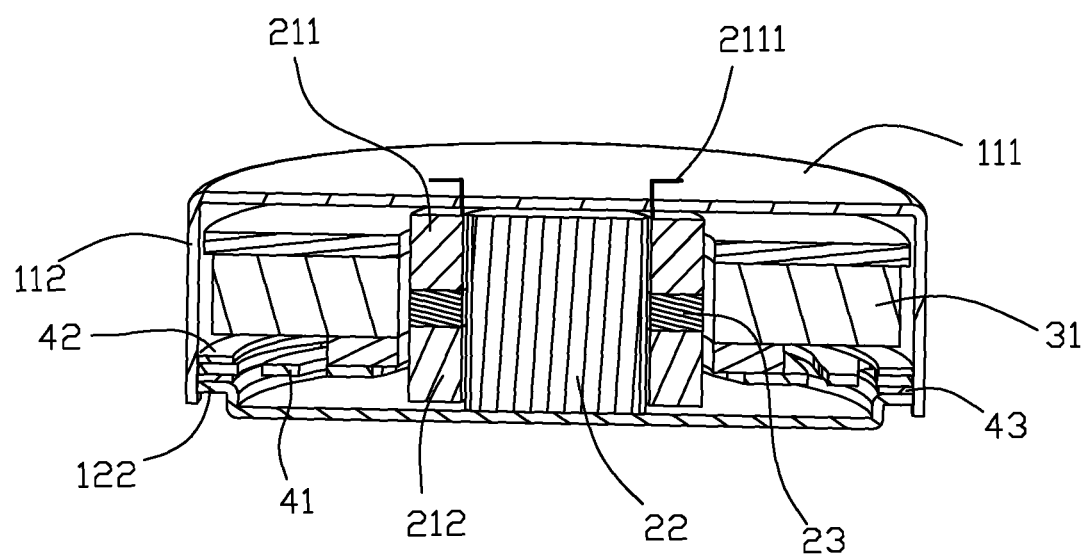
FIG. 2 is a sectional view of a vibration motor according to the present disclosure.

As shown in FIG. 1 and FIG. 2, the present disclosure provides a vibration motor 100, including a housing 1, and a stator 2, a vibrator 3, and an elastic support component 4 elastically supporting the vibrator 3 that are accommodated in the housing 1.

The housing 1 includes an upper housing 11 and a lower housing 12 that matches the upper housing 11 to define an accommodation space. The upper housing 11 includes a top wall 111 and a side wall 112 extending from the top wall 111 in a bending manner. The lower housing 12 includes a bottom wall 121 opposite the top wall 111 and a crimping 122 extending in a bending manner from an edge of the bottom wall 121 towards the top wall 111. The crimping 122 abuts against an inner surface of the side wall 112, to encapsulate the housing 1.

The stator 2 is fixed on the housing 1, and one end of the elastic support component 4 is connected to the vibrator 3 and the other end is connected to the side wall 112 of the housing 1.

The stator 2 specifically includes a coil 21 disposed on the housing 1 and an iron core 22 corresponding to the coil 21.

The vibrator 3 includes a ring-shaped magnet steel 31 that surrounds the coil 21 and the iron core 22 and that is spaced from the coil 21 and the iron core 22. During electrification, under the action of a Lorentz force in a magnetic field, the coil 21 drives the vibrator 3 to axially vibrate. Specifically, in this embodiment, the coil 21 includes a first coil 211 disposed on the top wall 111 and a second coil 212 disposed on the bottom wall 121. The first coil 211 and the second coil 212 are flat coils that are sleeved over the iron core 22 from two ends of the iron core 22. During electrification, the coil 21 form a magnetic field with the iron core 22, and form an axial driving force with the magnet steel 31 of the vibrator 3 to drive the vibrator 3 to vibrate.

Further, a spacer 23 is further disposed between the first coil 211 and the second coil 212. A lower surface of the spacer 23 abuts against an upper surface of the second coil 212, and an upper surface of the spacer 23 abuts against a lower surface of the first coil 211. The first coil 211, the second coil 212, and the spacer 23 have a same outer diameter. The spacer 23 is a ring-shaped structure, and has a role of separating two voice coils, and assisting positioning. The spacer 23 may be made of a magnetically conductive material or may be made of a non-magnetically conductive material. Preferably, the spacer 23 is made of a magnetically conductive material. In this case, the spacer 23 can not only play a role of assisting positioning, but also be actively magnetically conductive, and prevent a magnetic field in a same direction from penetrating two voice coils at the same time.

The vibrator 3 includes a ring-shaped magnet steel 31 surrounding the stator, a first pole core 32 disposed on one side of the magnet steel 31 close to the top wall 111, and a second pole core 33 disposed on the other side of the magnet steel 31 close to the bottom wall 121. The first pole core 32 is attached to an upper surface of the magnet steel 31, and the second pole core 33 is attached to a lower surface of the magnet steel 31. The second pole core 33 has a same inner diameter as the magnet steel 31, but a smaller outer diameter than the magnet steel 31. In this case, it helps to provide a deformation space for the elastic support component 4.

The elastic support component 4 includes a ring-shaped spring plate 41 and a first fixing ring 42 and a second fixing ring 43 respectively disposed at two sides of the spring plate 41. The spring plate 41 includes an outer ring 411 connected to the housing 1, an inner ring 412 connected to the vibrator 3, and a connecting ring 413 connecting the outer ring 411 and the inner ring 412. One side of the second pole core 33 abuts against a bottom side of the magnet steel 31, and the other side is connected to the inner ring 412 of the spring plate. The first fixing ring 42 and the second fixing ring 43 fix the outer ring 411 of the spring plate 41 by clamping. The second fixing ring 43 is disposed on a lower surface of the spring plate 41, and is lapped on a crimping 122 of the housing 1, to fix the elastic support component 4 and the vibrator 3.

Further, the vibration motor further includes a flexible circuit board 5 configured to be electrically connected to the second coil 212, and a coil lead wire on the second coil 212 is electrically connected to the flexible circuit board 5. Further, a through hole 1110 running through the top wall 111 is provided on the top wall 111 of the housing 1. The through hole 1110 is disposed within an orthographic projection of the first coil 211 in the top wall 111, and the coil lead wire 2111 vertically extends from an edge of the first coil toward the top wall 111 to the exterior of the housing 1 and runs through the through hole, so that the first coil 211 and the second coil 212 are respectively electrically connected, thereby avoiding winding and breaking of different coil lead wires inside the housing which affects product reliability. The through hole 1110 is provided within the orthographic projection of the first voice coil 211 on the top wall 111, so that space can be used to the largest extend, and magnetic circuit spaced occupied is avoided, thereby further ensuring electromagnetic performance of the product.

A vibration motor in the present disclosure includes a housing, and a stator, a vibrator, and an elastic support component elastically supporting the vibrator that are accommodated in the housing. The housing includes a top wall, a bottom wall disposed opposite the top wall, and a side wall connecting the top wall and the bottom wall. The stator includes a first coil disposed on the top wall, a second coil disposed on the bottom wall, and an iron core disposed corresponding to the coil; the first the coil and the second coil are sleeved over the iron core from two ends of the iron core, the vibrator is sleeved around the stator and spaced from the stator, the elastic support component supports the vibrator to axially vibrate. The top wall is provided with a through hole running through the top wall, the first coil is provided with a coil lead wire, and the coil lead wire extends from the through hole to the exterior of the housing. According to the vibration motor having this structure, the first coil and the second coil are connected in a different electrical connection manner, so that an existing problem of winding of lead wires is resolved, thereby improving reliability performance of the product.

Although the embodiments of the present disclosure are shown and described above, it can be understood that the embodiments are exemplary and cannot be construed as limitations to the present disclosure, and a person of ordinary skill in the art can make changes, modifications, replacements, and variations to the embodiments within the scope of the present disclosure.

What is claimed is:

1. A vibration motor, comprising a housing; and a stator, a vibrator, and an elastic support component elastically supporting the vibrator that are accommodated in the housing;
    wherein the housing comprises a top wall, a bottom wall disposed opposite the top wall, and a side wall connecting the top wall and the bottom wall;
    wherein the stator comprises a first coil disposed on the top wall, a second coil disposed on the bottom wall, and an iron core disposed corresponding to the coil; the first the coil and the second coil are sleeved over the iron core respectively from two ends of the iron core, the vibrator is sleeved around the stator and spaced from the stator, the elastic support component supports the vibrator to axially vibrate; wherein the elastic support component comprises a ring-shaped spring plate; and the spring plate comprises an outer ring connected to the housing, an inner ring connected to the vibrator, and a connecting ring connecting the outer ring and the inner ring; the elastic support component further comprises a first fixing ring and a second fixing ring that fix the spring plate through clamping; and the outer ring of the spring plate is sandwiched between the first fixing ring and the second fixing ring, and connected to the housing by using the first fixing ring and the second fixing ring;
    the top wall is provided with a through hole running through the top wall, the first coil is provided with a coil lead wire, and the coil lead wire extends from the through hole to the exterior of the housing.

2. The vibration motor according to claim 1, wherein the through hole is provided within an orthographic projection of the first coil on the top wall, and the coil lead wire extends vertically from an edge of the first coil toward the top wall and runs through the through hole.

3. The vibration motor according to claim 1, wherein the vibrator comprises a magnet steel, a first pole core disposed at one side of the magnet steel close to the top wall, and a second pole core disposed on the other side of the magnet steel close to the bottom wall.

4. The vibration motor according to claim 1, wherein one side of the second pole core abuts against a bottom side of the magnet steel, and the other side of the second pole core is connected to the inner ring of the spring plate.

5. The vibration motor according to claim 1, wherein the housing comprises:
    an upper housing having the top wall and the side wall, and
    a lower housing that matches the upper housing to define an accommodation space; wherein the lower housing comprises the bottom wall and a crimping extending from the bottom wall toward the top wall, and the crimping abuts against an inner outer surface of the side wall, and the elastic support component is lapped on the crimping.

6. The vibration motor according to claim 1, wherein the stator further comprises a spacer disposed between the first coil and the second coil.

7. The vibration motor according to claim 1, further comprising a flexible circuit board disposed on the bottom wall and electrically connected to the second coil.

* * * * *